United States Patent [19]

Kim

[11] Patent Number: 5,802,165

[45] Date of Patent: Sep. 1, 1998

[54] DIAL INFORMATION STORING AND REDIALING METHOD FOR USE IN A TELEPHONE

[75] Inventor: Hyun-Suck Kim, Gumi, Rep. of Korea

[73] Assignee: SamSung Electronics Co., Ltd., Suwon, Rep. of Korea

[21] Appl. No.: 658,795

[22] Filed: Jun. 5, 1996

[30] Foreign Application Priority Data

Jun. 9, 1995 [KR] Rep. of Korea ............... 15220

[51] Int. Cl.⁶ ................................................. H04M 1/27
[52] U.S. Cl. .................. 379/356; 379/354; 379/355; 379/216
[58] Field of Search ........................ 379/356, 354, 379/355, 359, 216, 58, 142, 357

[56] References Cited

U.S. PATENT DOCUMENTS

| | | | |
|---|---|---|---|
| 4,508,939 | 4/1985 | Lawson et al. | 379/354 |
| 4,602,128 | 7/1986 | Freundlick | 379/354 |
| 4,930,155 | 5/1990 | Kurokawa | 379/354 |
| 5,136,637 | 8/1992 | Rust et al. | 379/356 |
| 5,182,769 | 1/1993 | Yamaguchi | 379/387 |
| 5,243,646 | 9/1993 | McCarthy | 379/356 |
| 5,247,572 | 9/1993 | Koma | 379/356 |
| 5,268,959 | 12/1993 | Hong | 379/356 |
| 5,392,340 | 2/1995 | Otsuka | 379/201 |
| 5,394,462 | 2/1995 | Maemura | 379/142 |
| 5,454,035 | 9/1995 | Oba et al. | 379/356 |
| 5,491,745 | 2/1996 | Roeder | 379/356 |
| 5,568,546 | 10/1996 | Marutiak | 379/356 |
| 5,590,189 | 12/1996 | Turnbull et al. | 379/356 |
| 5,590,190 | 12/1996 | Kageyama | 379/356 |

*Primary Examiner*—Krista Zele
*Assistant Examiner*—Jacques M. Saint-Surin
*Attorney, Agent, or Firm*—Robert E. Bushnell, Esq.

[57] ABSTRACT

A method for storing dial information regarding a previously dialed telephone number in a nonvolatile memory during an originating speech and for processing the dial information stored in the nonvolatile memory during a redial function. The method for use in a telephone having a redial buffer and a nonvolatile memory includes determining whether an originating speech is formed, storing the dial information representing a dialed telephone number of a called subscriber in a redial buffer, and storing the dial information of the redial buffer in a nonvolatile memory, so that a redial function can be reliably serviced even when the power supply has been cut off.

20 Claims, 3 Drawing Sheets

DIAL INFORMATION STORING AND REDIALING METHOD FOR USE IN A TELEPHONE

CROSS-REFERENCE TO RELATED APPLICATION

This application makes reference to, incorporates the same herein, and claims all benefits accruing under 35 U.S.C. §119 from an application for *Dial Information Storing And Redialing Method For Use In A Telephone* earlier filed in the Korean Industrial Property Office on 7 Jun. 1995, and there duly assigned Ser. No. 10167/1995.

BACKGROUND OF THE INVENTION

1. Technical Field

The present invention relates to a redialing method for a telephone, and more particularly to a method of reliably storing a previously dialed telephone number in a nonvolatile memory, and for redialing the digits of the previously dialed telephone number stored in the nonvolatile memory when a redial key is pressed by an operator.

2. Background Art

Conventional telephone systems are widely used to perform a memory dial function and a redial function. In the memory dial mode, telephone numbers of called subscribers are registered in a volatile memory such as a random-access-memory (RAM) in terms of abbreviated telephone numbers of one or more digits such as disclosed, for example, in U.S. Pat. No. 5,182,769 for *Telephone Set Having A Volatile Memory* issued to Yamaguchi et al. When an abbreviated number of a designated called subscriber is dialed, the telephone number corresponding to the abbreviated number is read from the volatile memory and is sent to the telephone of the called subscriber.

In the redial mode, a last dialed telephone number is stored in a redial buffer if a connection to a destination telephone has not been successfully completed so that a caller may send a call signal by simply depressing a redial button without inputting the entire digits of the telephone number of a called subscriber. Typically, the telephone number of a called subscriber is first stored in a key buffer when the digits representing such a telephone number are entered by a caller. Once the connection to a destination telephone has been completed, the last dialed telephone number stored in the key buffer is transferred to a redial buffer for redialing purposes. The telephone number stored in the redial memory may also be automatically redialed for a long distance call such as disclosed in U.S. Pat. No. 5,268,959 for *Telephone Long Distance Redialing Apparatus And Process* issued to Hong.

One known problem with the redial feature of the conventional telephone system is that the telephone system is structured to store only the last dialed telephone number and the contents of the redial memory are disturbed by any subsequent telephone dialing. That is, if the caller placed a call to another subscriber after an unsuccessful call to a desired subscriber, the caller cannot use a redial function to place a call to the desired subscriber after calling the other subscriber. In this situation, the caller must again input the entire telephone number of the desired subscriber. One prior art redial arrangement that seeks not to disturb the contents of the redial memory is disclosed, for example, in U.S. Pat. No. 4,508,939 for *Last Number Redial Device* issued to Lawson et al. Other redial arrangements that seek to overcome the above problem are disclosed, for example, in U.S. Pat. No. 4,602,128 for *Automatic Redialing Arrangement For Multi-Line Telephone Station Sets* issued to Freundlich, U.S. Pat. No. 4,930,155 for *Multiple Redialing System* issued to Kurokawa, and U.S. Pat. No. 5,136,637 for *Method And Apparatus For Automatic Redialing Of Telephone Numbers* issued to Rust et al. In Rust '637 and Kurokawa '155, for example, a directory of telephone numbers to be redialed is retained and is visually provided for the caller's selection.

Another problem with the redial feature of the conventional telephone system, as I have observed, is that the key buffer used in the conventional telephone system is also a volatile memory and is thus likely to lose its stored telephone number inadvertently. This is common when a voltage supplied to the volatile memory is carelessly disrupted, reduced to an unacceptable level or is cut-off by accident in which case, the last dialed telephone number stored in the key buffer will be erased, and consequently, the telephone system cannot perform the redial function. One potential solution to this problem, as I noted, is to provide a back-up power supply in the events that a main power supply is cut off so that the last dialed telephone number stored in the key buffer will be erased. However, this power supply scheme may not be cost effective. Accordingly, I believe that an improved cost effective redialing method for a telephone system which effectively enables a caller to reliably redial a previously dialed telephone number can be contemplated.

SUMMARY OF THE INVENTION

Accordingly, it is therefore an object of the present invention to provide an improved redialing method for a telephone.

It is also an object to provide a redialing method capable of reliably storing a dialed telephone number in a nonvolatile memory, and for redialing the digits of the previously dialed telephone number stored in the nonvolatile memory when a redial key is pressed by an operator.

These and other objects may be achieved by a dial information storing and redialing method for use in a telephone system constructed according to the principles of the present invention having a volatile memory comprising a redial buffer and a key buffer, and a non-volatile memory. The redial method includes determining whether a redial key is input by a caller while the telephone system is in a speech mode; determining whether there is any dial information at the key buffer, when the telephone system is in the speech mode; storing said dial information of the key buffer at the redial buffer, when it is determined that there is dial information at the key buffer; comparing the dial information stored at the redial buffer with the information stored at the nonvolatile memory; returning to a stand-by state when the dial information stored at the redial buffer corresponds to the information stored at the nonvolatile memory; storing the dial information of the redial buffer at the nonvolatile memory, when the dial information stored at the redial buffer does not correspond to the information stored at the non-volatile memory; determining whether there is any dial information at the redial buffer, when it is determined that there is no dial information at the key buffer; storing dial information of the redial buffer at the key buffer and then dialing a called subscriber using the dial information, when it is determined that there is dial information at the redial buffer; and storing the dial information of the nonvolatile memory at the redial buffer, and storing the dial information of the redial buffer at the key buffer and then dialing the called subscriber using the dial information, when it is determined that there is no dial information at the redial buffer.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
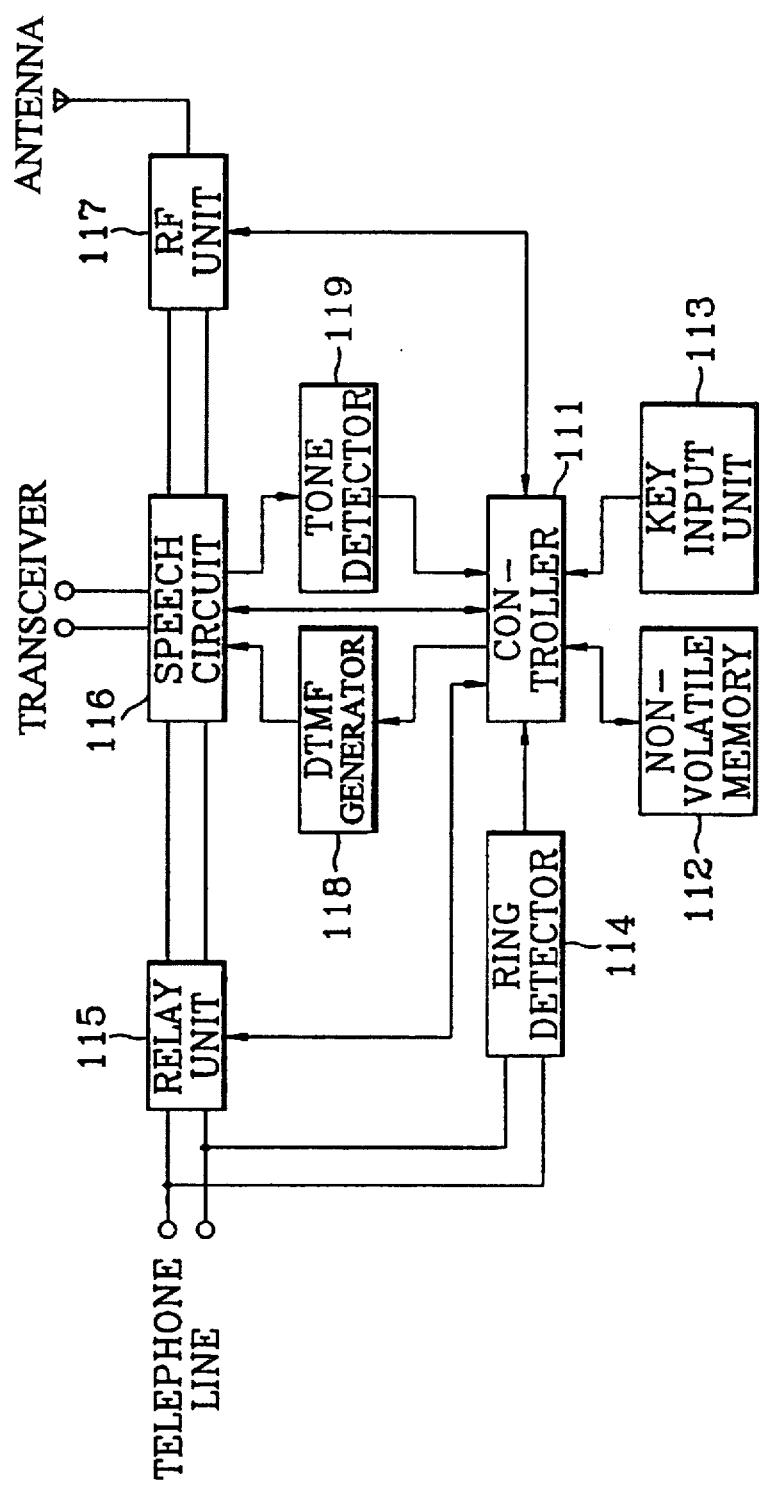
FIG. 1 is a block diagram illustrating the construction of a telephone system for processing dial information according to the present invention.

Referring now to the drawings and particularly to FIG. 1, which illustrates a telephone system constructed according to the principles of the present invention. The telephone system as contemplated by the present invention for processing dial information may be a general telephone, an automatic answering telephone, a multi-function telephone, a radio telephone or a key phone system. As shown in FIG. 1, the telephone system includes a controller 111, a nonvolatile memory 112, a key input unit 113, a ring detector 114, a relay unit 115, a speech circuit 116, a radio-frequency (RF) unit 117, a dual tone multi-frequency (DTMF) generator 118 and a tone generator 119.

Controller 111 may be constructed by a one-chip microprocessor for controlling the overall operation of the radio telephone. The controller 111 includes a read-only-memory (ROM) for storing an application program and a random-access-memory (RAM) for temporarily storing data generated while executing the application program. The RAM has a key buffer for storing telephone numbers to be input during an originating speech and a redial buffer for enabling performance of a redial function.

Nonvolatile memory 112 contains function tables for servicing various functions and includes a memory region for enabling performance of a redial function according to the present invention. An EEPROM can be used for the non-volatile memory 112. The key input unit 113 includes a plurality of alpha-numeric function keys for setting various modes of operation and performing a dialing function and a redialing function. The key input unit 113 outputs key data corresponding to the user's key input to the controller 111. A ring detector 114 is connected to a telephone line for detecting a ring signal received from the telephone line indicating an incoming telephone call when the telephone is in an on-hook state and then transmitting a detected ring signal to the controller 111 to inform of an incoming telephone call.

Relay unit 115 includes an on/off hook switch for enabling connection or isolation of a speech path between the telephone line and the telephone under the control of the controller 111. A speech circuit 116 is connected between the relay unit 115 and a transceiver. The speech circuit 117 may be constructed by a speech IC is connected to the telephone line in order to process various tone signals and voice signals to be transmitted/received via the telephone line. The transceiver may be a microphone or a speaker phone.

If the telephone is a wireless type of telephone system, the RF unit 117 is connected to the speech circuit 116 and an antenna for processing radio-frequency signals received via an antenna. A dual tone multi-frequency (DTMF) generator 118 is connected to the controller 111 and the speech circuit 116 for converting the digital data output from the controller 111 into a dual tone multi-frequency (DTMF) signal and then outputting the DTMF signal to the speech circuit 117. A DTMF receiver 119 is connected to the controller 111 and the speech circuit 117 for converting the DTMF signal output from the speech circuit 117 into digital data and then outputting the digital data to the controller 111. A tone detector 119 is connected to the speech circuit 117 for detecting a dial tone from a signal received from the transceiver, converting the tone signal output from the speech circuit 116 into digital data and outputting the tone signal to the controller 111.

Figure 2A:
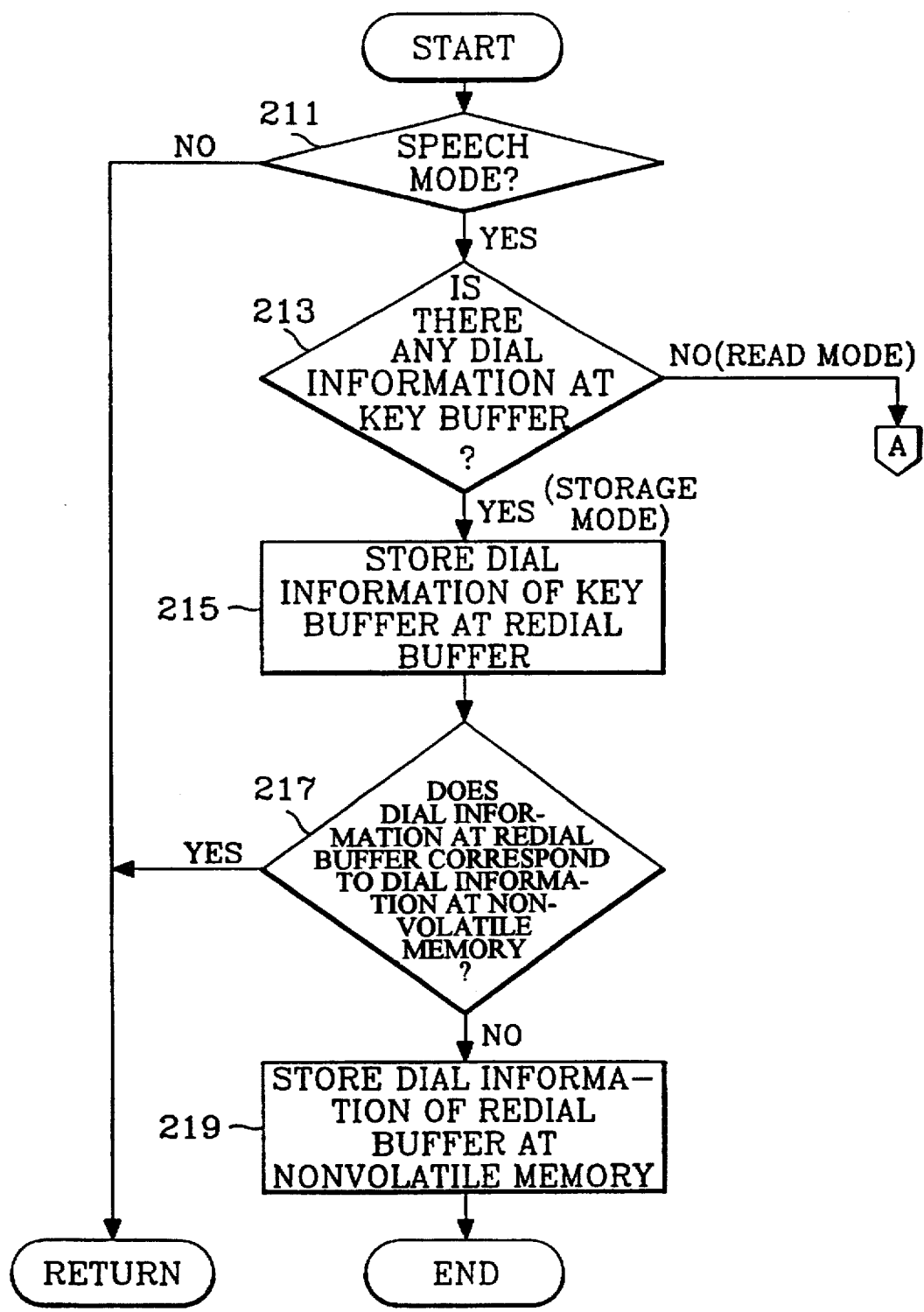
FIGS. 2A and 2B are a composite flow chart illustrating the storage of dial information in a nonvolatile memory and the redialing of the dial information stored in the nonvolatile memory according to the present invention.
Figure 2B:
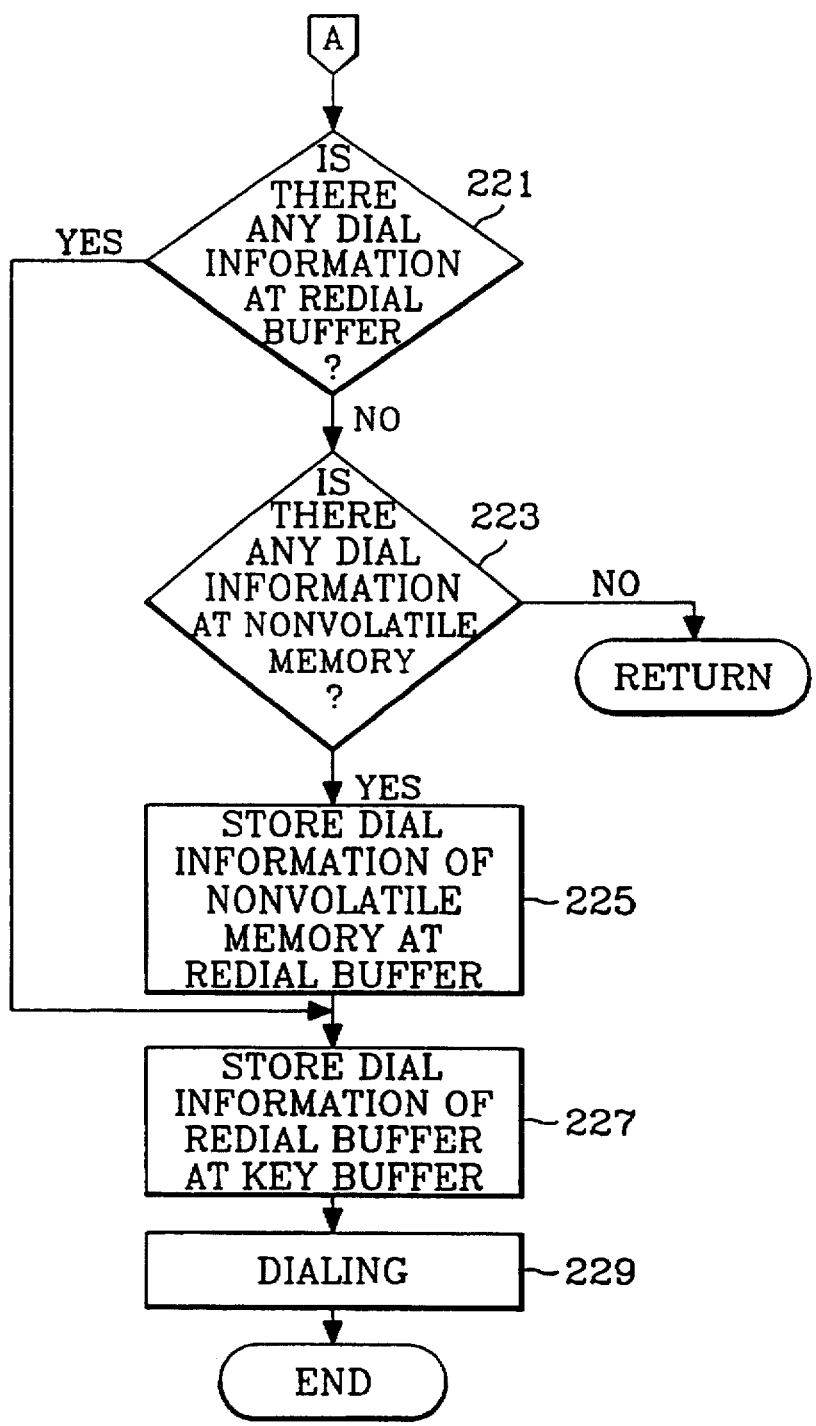

Turning now to FIGS. 2A and 2B which illustrate a process of storing dial information such as a dialed telephone number of a current called subscriber in a non-volatile memory 112 while a speech path is formed, and redialing the dial information representing a previously dialed telephone number of the last called subscriber from the non-volatile memory according to the principles of the present invention. Referring to FIGS. 2A and 2B, dial information for the redial function is stored only in a speech state so that the telephone number which has been successfully serviced is stored as redial information. Thus, if a redial key is depressed by a caller through the key input unit 113, the controller 111 determines whether the telephone system is in a speech mode at step 211. If the telephone system is in a speech mode at step 211, the controller 111 determines, at step 213, whether there is any dial information at the key buffer of the RAM (not shown). If the dial information is stored at the key buffer, the controller 111 switches to a storage mode to first store the dial information of the key buffer at the redial buffer and then sequentially store the dial information of the redial buffer at a non-volatile memory 112. If, on the other hand, the dial information is not stored at the key buffer, the controller 111 switches to a read mode for enabling redialing of the stored dial information.

First, the operation of the telephone system constructed according to the principles of the present invention during the storage mode will be discussed as follows. When the controller 111 determines, at step 213, that there is any dial information at the key buffer, the dial information of the key buffer is stored in the redial buffer at step 215. Then, the controller 111 determines whether the dial information stored at the redial buffer corresponds to the information stored at the nonvolatile memory 112. If the dial information stored at the redial buffer corresponds to the information stored at the nonvolatile memory 112, the controller 111 does not store the dial information of the redial buffer but returns to an original state. This means that the telephone number to be redialed is identical to the previously dialed telephone number. However, if the dial information stored at the redial buffer does not correspond to the information stored at the nonvolatile memory 112, this means that the previous dial information is different from the present dial information. In this case, the controller 111 renews dial information by storing the dial information of the redial buffer at the nonvolatile memory 112. Since the dial information is stored at the non-volatile memory 112, the dial information can not be lost even when the power supply to the telephone system is cut off.

Second, the operation of the telephone system constructed according to the principles of the present invention during the read mode will be discussed as follows. When the controller 111 determines, at step 213, that there is no dial information at the key buffer, the controller 111 determines whether there is any dial information at the redial buffer at step 221. If there is any dial information at the redial buffer at step 221, the controller 111 proceeds to step 227 and stores the dial information of the redial buffer at the key buffer. After the dial information of the redial buffer is stored at the key buffer during the read mode, the controller 111 outputs the dial information stored at the key buffer to the DTMF generator 118 for dialing at step 229. The DTMF generator 118 then converts the dial information into the DTMF signal and transmits the DTMF signal to the telephone line through the speech circuit 116.

If there is no dial information at the redial buffer at step 221 however, the controller 111 determines whether there is any dial information at the non-volatile memory 112 at step 223. When there is no dial information at the nonvolatile memory 112, the controller 111 generates a beep tone and then returns to an original state. However, if there is any dial information at the nonvolatile memory 112, the controller 111 stores the dial information of the nonvolatile memory 112 at the redial buffer at step 225 and then proceeds to steps 227 and 229.

Summarizing the operation of the telephone system during the read mode, since there is no dial information at the nonvolatile memory 112 in an initial state, the redial function cannot be performed. In addition, since the dial information is stored at the redial buffer in a state where the operational power is normally applied, the information at the redial buffer is directly accessed and then dialed while performing the redial function. However, if the operational power has been cut off in the previous state, the information at the redial buffer is erased. In this case, the dial information stored at the nonvolatile memory 112 is stored again at the redial buffer and then is dialed. Accordingly, no dial information regarding a previously dialed telephone number can be lost even when the operational power has been cut off.

While there have been illustrated and described what are considered to be preferred embodiments of the present invention, it will be understood by those skilled in the art that various changes and modifications may be made, and equivalents may be substituted for elements thereof without departing from the true scope of the present invention. For instance, a universal long distance prefix in the form of the numeral "1" before a last number dialed memory recorded number may be incorporated into the telephone system constructed according to the principles of the present invention in a way that was disclosed by Hong, U.S. Pat. No. 5,268,959 so that the telephone number stored in the redial memory may be automatically redialed for a long distance call. Similarly, while the telephone system as contemplated by the present invention is structured to store only the last dialed telephone number for redialing purposes, a directory of telephone numbers to be redialed may be incorporated and retained for the purposes of providing a visual display of all previously dialed telephone numbers for the caller's selection. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of storing dial information and redialing said dial information in a telephone system, said method comprising the steps of:

determining whether said telephone system having at least a redial buffer and a non-volatile memory incorporated therein and a keypad comprising a plurality of discrete keys including a redial key that are independently operable by manual depression by a caller to generate at least a telephone number of a called subscriber, is in an originating speech mode;

storing dial information representing a telephone number of a currently called subscriber in said redial buffer, when said telephone system is in the originating speech mode; and storing said dial information of said redial buffer at said non-volatile memory so that, when said redial key is depressed by the caller, said dial information stored in said non-volatile memory is automatically accessed for performing a redial function, said dial information stored in said non-volatile memory being accessed by the steps of:

determining whether said redial key is depressed by the caller;

when said redial key is depressed by the caller, determining whether there is any dial information stored at said redial buffer;

when there is said dial information stored at said redial buffer, storing said dial information stored at said redial buffer in a key buffer for automatically redialing said dial information representing a previously dialed telephone number of a called subscriber;

when there is no dial information stored at said redial buffer, determining whether there is any dial information stored at said non-volatile memory;

when there is said dial information stored at said non-volatile memory, storing said dial information stored at said non-volatile memory in said redial buffer; and storing said dial information stored at said redial buffer in said key buffer for automatically redialing said dial information representing said previously dialed telephone number of a called subscriber.

2. The method of claim 1, further comprised of said redial buffer corresponding to a random-access-memory.

3. The method of claim 1, further comprised of said non-volatile memory corresponding to an EEPROM.

4. A method of storing dial information and redialing said dial information in a telephone system, comprising the steps of:

determining whether said telephone system is in use, said telephone system having a non-volatile memory and a volatile memory including a redial buffer and a key buffer;

when said telephone system is in use, storing dial information representing a telephone number of a currently called subscriber in said redial buffer, and storing said dial information of said redial buffer in said non-volatile memory, when said telephone system is in use;

after said telephone system is in use, determining whether a redial key is depressed by a caller; when said redial key is depressed by the caller, determining whether there is any dial information stored at said redial buffer;

when there is said dial information stored at said redial buffer, storing said dial information stored at said redial buffer in a key buffer, and automatically redialing said dial information representing a previously dialed telephone number of a called subscriber;

when there is no dial information stored at said redial buffer determining whether there is any dial information stored at said non-volatile memory; and when there is said dial information stored at said non-volatile memory, storing said dial information stored at said non-volatile memory in said redial buffer, storing said dial information stored at said redial buffer in said key buffer, and automatically redialing said dial information representing said previously dialed telephone number of a called subscriber.

5. The method of claim 4, further comprised of said volatile memory corresponding to a random-access-memory.

6. The method of claim 4, further comprised of said non-volatile memory corresponding to an EEPROM.

7. A dial information storing and redialing method for use in a telephone system having a volatile memory comprising a redial buffer and a key buffer, and a nonvolatile memory, said method comprising the steps of:

determining whether a redial key is input by a caller while the telephone system is in a speech mode;

determining whether there is any dial information at said key buffer, when the telephone system is in said speech mode;

storing said dial information of said key buffer at said redial buffer, when it is determined that there is dial information at said key buffer;

comparing said dial information stored at said redial buffer with the information stored at said nonvolatile memory;

returning to a stand-by state when said dial information stored at said redial buffer corresponds to the information stored at said nonvolatile memory;

storing said dial information of said redial buffer at said nonvolatile memory, when said dial information stored at said redial buffer does not correspond to the information stored at said nonvolatile memory;

determining whether there is any dial information at said redial buffer, when it is determined that there is no dial information at said key buffer;

storing dial information of said redial buffer at said key buffer and then dialing a called subscriber using said dial information, when it is determined that there is said dial information at said redial buffer; and storing said dial information of said nonvolatile memory at said redial buffer, and storing said dial information of said redial buffer at said key buffer and then dialing the called subscriber using said dial information, when it is determined that there is no dial information at said redial buffer.

8. The method of claim 7, further comprised of said volatile memory corresponding to a random-access-memory.

9. The method of claim 8, further comprised of said non-volatile memory corresponding to an EEPROM.

10. A telephone system, comprising:

key input means comprising a redial key for allowing a caller to automatically redial a last dialed telephone number of a called subscriber;

a volatile memory comprising a key buffer and a redial buffer;

a non-volatile memory for storing the last dialed telephone number of a called subscriber;

controller means for controlling the storing of the last dialed telephone number of the called subscriber for subsequent redialing by:

determining whether said telephone system is in an originating speech mode;

determining whether there is any telephone number stored at said key buffer, when said telephone system is in the originating speech mode;

when there is a telephone number stored at said key buffer, storing the telephone number of a current called subscriber in said redial buffer;

determining whether the telephone number of the current called subscriber at said redial buffer corresponds to the telephone number at said non-volatile memory;

when the telephone number of the current called subscriber at said redial buffer does not correspond to the telephone number at said non-volatile memory, storing the telephone number of the current called subscriber of said redial buffer in said non-volatile memory; and when the telephone number of the current called subscriber at said redial buffer corresponds to the telephone number at said non-volatile memory, returning to a stand-by mode.

11. The telephone system of claim 10, further comprised of said controller means further controlling the automatic redialing of the last dialed telephone number upon depression of said redial key by said caller, by:

determining whether there is any telephone number at said redial buffer, when there is no telephone number stored at said key buffer;

storing the telephone number stored at said redial buffer in said key buffer for automatically redialing said telephone number of the last called subscriber, when there is telephone number stored at said redial buffer;

determining whether there is any telephone number stored at said non-volatile memory, when there is no telephone number stored at said redial key;

storing the telephone number stored at said non-volatile memory in said redial buffer, when there is telephone number stored at said non-volatile memory; and storing the telephone number stored at said redial buffer in said key buffer for automatically redialing said telephone number of the last called subscriber, after the telephone number stored at said non-volatile memory has been stored in said redial buffer.

12. The telephone system of claim 11, further comprised of said volatile memory corresponding to a random-access-memory.

13. The telephone system of claim 12, further comprised of said non-volatile memory corresponding to an EEPROM.

14. A method of storing dial information and redialing said dial information a telephone system having a non-volatile memory and a volatile memory including a redial buffer and a key buffer incorporated therein, said method comprising the steps of:

determining whether there is any dial information representing a telephone number of a called subscriber at said key buffer, when the telephone system is in use;

when there is dial information at said key buffer, storing said dial information of said key buffer at said redial buffer, comparing said dial information stored at said redial buffer with information contained in said non-volatile memory, and storing said dial information of said redial buffer at said non-volatile memory when said dial information stored at said redial buffer does not correspond to the information contained in said non-volatile memory; and when there is no dial information at said key buffer, determining whether there is any dial information at said redial buffer, storing dial information of said redial buffer at said key buffer and then dialing a called subscriber using said dial information when there is said dial information at said redial buffer, and storing said dial information of said non-volatile memory at said redial buffer and then dialing the called subscriber using said dial information when there is no dial information at said redial buffer.

15. The method of claim 14, further returning to a stand-by state when said dial information stored at said redial buffer corresponds to the information stored at said non-volatile memory, when there is dial information at said key buffer.

16. The method of claim 15, further comprised of said non-volatile memory corresponding to an EEPROM.

17. The method of claim 16, further comprised of said non-volatile memory corresponding to an EEPROM.

18. The method of claim 14, further comprised of said volatile memory corresponding to a random-access-memory.

19. The method of claim 18, further comprised of said non-volatile memory corresponding to an EEPROM.

20. The method of claim 14, further comprised of said non-volatile memory corresponding to an EEPROM.

* * * * *